3,296,283
STEROID INTERMEDIATES AND PROCESS
FOR PREPARING
Alexander D. Cross, Mexico City, Mexico, assignor to Syntex Corporation, Panama, Panama, a corporation of Panama
No Drawing. Filed May 24, 1963, Ser. No. 282,849
21 Claims. (Cl. 260—347.3)

The present invention relates to novel processes for the production of novel cyclopentanophenanthrene derivatives.

More particularly, the present invention relates to novel des-A-androstane and des-A-pregnane derivatives, and to novel methods for the production thereof from the corresponding $\Delta^{1,4}$-androstadien-3-one and $\Delta^{1,4}$-pregnadien-3-one compounds.

The novel tricyclic compounds of the present invention are represented by the following formulae:

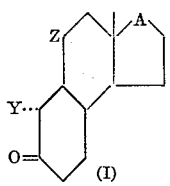 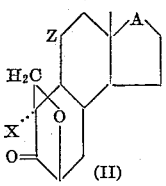

In the above formulas Y represents formyl or hydroxymethyl; X represents hydrogen or carboxyl; A may be

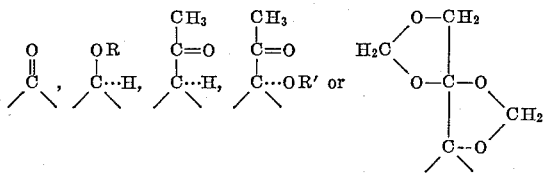

wherein R and $R^1$ each represent hydrogen or a hydrocarbon carboxylic acyl group of less than 12 carbon atoms, preferably a lower alkanoyl group and Z represents

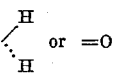

The acyl groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The novel compounds of the present invention are useful intermediates in the production of 10α-androstanes and 10α-pregnanes, especially of their 19-(hydroxy, oxo, halo, alkyl or alkenyl) derivatives, which are of great therapeutic value and some of which were the object of my copending U.S. patent applications Serial Nos. 231,830, 231,831, and 231,832, all filed October 19, 1962.

For example, the compounds represented by Formula I may be treated with methyl-vinyl-ketone, 1,3-dichloro-2-butene or 4-bromobutan-2-ol benzyl ether following procedures identical or similar to those described by Velluz et al., Angew. Chem. 72, 725, 1960 or Sondheimer et al., Tetrahedron, letters No. 22, 38 (1960) to give the corresponding 19-hydroxy or 19-oxo-10α-androstane or 10α-pregnane derivatives which in turn may be converted to the corresponding 19-halo compounds by tosylation of the 19-hydroxyl group followed by treatment with an alkali metal halide, or to the corresponding 19-methylene derivatives by treatment of the 19-oxo group by Wittig's reaction, etc. The compounds represented by Formula II may be treated with zinc in acetic acid or ethanol, to give the corresponding 19-hydroxy-10α-derivatives, which are included in Formula I and therefore may be subjected to the aforesaid transformations or the corresponding 19-hydroxy-10α-carboxylic derivatives which may be in turn decarboxylated thermally or with a mineral acid, thus undergoing concomitant epimerization at the C-10-position and furnishing the corresponding 19-hydroxy-10α-derivatives just mentioned.

The 10α-androstanes and 10α-pregnanes in general and the 19-hydroxy, halo and oxo derivatives thereof, in particular, are of great importance due to their unique therapeutic properties. For example 19-hydroxy-10α-progestational activity with absence of any androgenic effects, 19-oxo-10α-testosterone has a favorable anabolic androgenic ratio, etc.

The novel process of the present invention which may be used for producing the novel compounds represented by above Formulae I and II, among others, is exemplified by the following equation:

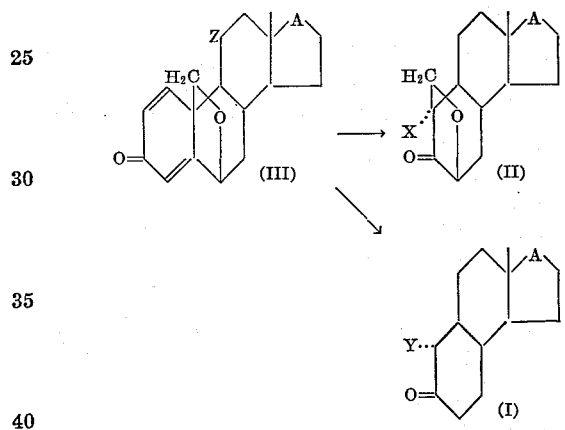

In the above formulate, A, X, Y and Z have the same meaning as set forth previously.

The starting compound (III) of the present process is a $\Delta^{1,4}$-3-keto-6β,19-oxido derivative of the pregnane or androstane series and may have, in addition to the substituents indicated by Formula III, several other substituents which do not interfere with the reaction. For example, there may be present lower alkyl groups at positions 7, 9, 11, 12, 15, 16, and/or 17, halo groups at positions 7, 9, 11, 12, 14, 15, 16, 17, 20 and/or 21, polyhalo alkyl groups at positions 15, 16 and/or 17, etc. The positions indicated hereinbefore for the mentioned substituents are preferential but not restrictive.

In proceeding in accordance with the above equation, the starting compound (III) is treated with ozone, preferably followed by hydrogen peroxide to produce several products which upon chromatographic separation furnish the corresponding 6β,19-oxido des-A-(androstane or pregnane)-5-one and the 10α-carboxy derivative thereof (II).

Following an alternate procedure, the starting compound (III) is treated with a strong oxidizing agent capable of attacking double bonds, preferably a salt which upon ionization produces anions having a reduction potential of the order of, or larger than +0.5 v. with respect to their nearest reduced state, preferably an alkali metal permanganate, e.g. potassium permanganate in neutral or weakly basic solution, and subsequently or simultaneously with an alkali metal perhalate, such as sodium periodate, preferably in solution in a strongly polar solvent, for example t-butanol-water and at temperatures adapted to the desired length of time (for example, at room temperature the reaction time is of about 2–3 hours) to give after chromatographic separation the corresponding 6β,19-oxido-des-A-(androstane or pregnane)-5-one (II; X=H), the 10α-carboxy derivative thereof (II: X=.COOH), the corresponding 10α-hydroxymethyl-des-A-19-nor-(androstane or pregnane)-5-one (I: Y=CH₂—OH) and the corresponding 10α-formyl-des-A-19-nor (androstane or pregnane)-5-one (I: Y=—CHO).

The latter process may also be applied to $\Delta^{1,4}$-3-keto derivatives of the androstane and pregnane series, thus being produced the corresponding des-A-10α-(androstane or pregnane)-5-one compounds. This last conversion is represented as follows:

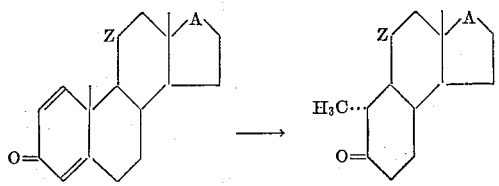

In the above formulae A and Z have the same meaning as described hereinbefore.

The following specific examples serve to illustrate but are not intended to limit the scope of the present invention:

PREPARATION 1

1 g. of 17,20;20,21-bismethylenedioxy-5α-bromo-6β,19-oxido-pregnane-3,11-dione obtained according to Bowers, U.S. Patent No. 3,065,228 was mixed with 100 cc. of acetone and 2 g. of potassium acetate, and the resulting mixture was refluxed for 3 hours. The whole was then poured into water, the precipitate filtered off, dried and recrystallized from acetone-hexane to give 17,20;20,21-bismethylenedioxy-6β,19-oxido-$\Delta^4$-pregnene-3,11-dione.

A mixture of 500 mg. of the latter steroid, 10 cc. of dioxane and 350 mg. of 2,3-dichloro-5,6-dicyano-1,4-benzoquinone was refluxed for 10 hours. It was then cooled the 2,3-dichloro-5,6-dicyano-1,4-benzohydroquinone formed during the reaction filtered off, and the filtrate evaporated to dryness. The residue was dissolved in acetone and filtered through 10 g. of alumina. Crystallization from acetone-hexane gave 17,20;20,21-bis-methylenedioxy-6β,19-oxido-$\Delta^{1,4}$-pregnadiene-3,11-dione.

17,20;20,21 - bismethylenedioxy - 5α - bromo - 6β,19-oxido-pregnan-3-one, obtained according to the aforesaid patent, was treated following the above procedures, thus giving as final product 17,20;20,21-bismethylenedioxy-6β,19-oxido-$\Delta^{1,4}$-pregnandien-3-one.

PREPARATION 2

5α-bromo-6β,19-oxido-androstane-3,17-dione, obtained according to the aforesaid patent, was treated with potassium acetate according to the procedure described in Preparation 2, thus yielding 6β,19-oxido-$\Delta^4$-androstene-3,17-dione.

A solution of 1 g. of sodium borohydride in 3 cc. of water was added to an ice-cooled solution of 1 g. of the latter compound in 120 cc. of methanol and the mixture was allowed to stand for 6 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was purified by crystallization from acetone-hexane to give 6β,19-oxido-$\Delta^4$-androstene-3β,17β-diol.

A mixture of the latter diol in 20 cc. of dioxane, and 1.1 molar equivalents of 2,3-dichloro-5,6-dicyano-1,4-benzoquinone was kept at room temperature for 3 hours. The hydroquinone formed during the reaction was filtered off, and the filtrate evaporated to dryness. The residue was dissolved in acetone and filtered through 20 g. of alumina. Crystallization from acetone-hexane gave 6β,19-oxido-$\Delta^4$-androsten-17β-ol-3-one.

The latter compound was dehydrogenated according to the method of Preparation 1 thus yielding 6β,19-oxido-$\Delta^{1,4}$-androstadien-17β-ol-3-one.

A mixture of 1 g. of the latter steroid, 4 cc. of pyridine and 2 cc. of acetic anhydride was kept at room temperature overnight, poured into ice water, the formed precipitate was filtered, washed with water and dried. Crystallization from acetone-hexane gave 6β,19-oxido-$\Delta^{1,4}$-androstadien-17β-ol-3-one acetate.

Example I

A solution of 5.2 g. of 6β,19-oxido-$\Delta^{1,4}$-androstadien-17β-ol-3-one acetate in 50 cc. of glacial acetic acid and 50 cc. of ethyl acetate was placed in an ozonization tube, cooled in an ice-salt bath. A stream of ozone was introduced for 2 hours (0.024 mol per hour), then 20 cc. of water and 3 cc. of 30% hydrogen peroxide were added and the mixture was stirred vigorously. The mixture was heated for half an hour on the steam bath and then kept at room temperature for 48 hours.

The resulting solution was concentrated to a small volume under reduced pressure on the steam bath, diluted with 20 cc. of methanol and poured into water. The mixture was extracted with ether, the extract was washed with water, dried over anhydrous sodium sulfate and evaporated to dryness. The residue was chromatographed on 250 g. of alumina, thus yielding in different elution fractions 6β,19 - oxido-17β-acetoxy-des-A-androstan-5-one-10α-carboxylic acid and 6β,19 - oxido-17β-acetoxy-des-A-androstan-5-one.

Example II

To a stirred solution of 5 g. of 6β,19-oxido-$\Delta^{1,4}$-androstandien-17β-ol-3-one acetate in 300 cc. of an azeotropic mixture of t-butanol and water was added 2.8 g. of potassium carbonate dissolved in 80 cc. of water, followed by 50 cc. of a solution of 20 g. of sodium periodate in 250 cc. of water and 5 cc. of a 0.8% solution of potassium permanganate in water. The rest of the periodate solution was then added little by little, adding the necessary further amounts of the permanganate solution to maintain the characteristic color.

After keeping the resulting mixture for 2 hours, at room temperature the excess of permanganate was destroyed with sodium bisulfite solution and the mixture was concentrated to a volume of 400 cc. cooled to 4° C., acidified with ice cold 50% sulfuric acid and extracted with methylene chloride. The organic solution was washed with aqueous sodium bisulfite solution until free of iodine, then with water to neutral, dried and evaporated to dryness. The residue was chromatographed on silica gel, thus separating into four products which after individual recrystallization from acetone-hexane afforded 6β,19 - oxido - 17β - acetoxy-des-A-androstan-5-one-10α-carboxylic acid, 6β,19 - oxido - 17β - acetoxy - des-A-androstan-5-one, 17β - acetoxy - 10α - hydroxymethyl-des - A - 19 - nor - androstan - 5 - one and 17β-acetoxy-10α-formyl-des-A-19-nor-androstan-5-one.

Example III

The procedure described in Example II was repeated except that potassium periodate and sodium permanganate were used instead of sodium periodate and potassium permangate respectively, thus furnishing exactly the same compounds as those obtained in said example.

Example IV

6β,19 - oxido - $\Delta^{1,4}$-androstadiene-3,17dione obtained according to Ringold et al. U.S. Patent No. 3,001,989, was treated following the procedure described in Example I, thus yielding 6β,19-oxido-des-A-androstane-5,17-dione-10α-carboxylic acid and 6β,19-oxido-des-A-androstane-5,17-dione.

Example V

6β,19 - oxido - Δ$^{1,4}$ - androstadiene-3,17-dione, was treated according to Example II, thus yielding 6β,19-oxido - des - A - androstane - 5,17 - dione-10α-carboxylic acid, 6β,19 - oxido - des - A - androstane-5,17-dione, 10α - hydroxymethyl - des - A - 19 - nor-androstane-5,17-dione and 10α - formyl-des-A-19-nor-androstane-5,17-dione.

Example VI

6β,19 - oxido - Δ$^{1,4}$ - pregnadiene-3,20-dione (Ringold et al. U.S. Patent No. 3,008,957) was treated according to Example I, thus yielding 6β,19-oxido-des-A-pregnane-5,20-dione-10α-carboxylic acid and 6β,19-oxido-des-A-pregnane-5,20-dione.

Example VII

6β,19 - oxido - Δ$^{1,4}$ - pregnadiene - 3,20-dione, was treated according to Example II, thus yielding 6β,19-oxido - des - A - pregnane-5,20-dione-10α-carboxylic acid, 6β,19 - oxido - des - A-pregnane-5,20-dione, 10α-hydroxymethyl - des - A - 19 - nor-pregnane-5,20-dione and 10α-formyl-des-A-19-nor-pregnane-5,20-dione.

Example VIII

6β,19 - oxido - Δ$^{1,4}$ - pregnadien-17α-ol-3,20-dione acetate (U.S. Pat. No. 3,008,957) was treated according to Example I, thus furnishing 6β,19-oxido-17α-acetoxy-des - A - pregnane - 5,20-dione-10α-carboxylic acid and 6β,19-oxido-17α-acetoxy-des-A-pregnane-5,20-dione.

Example IX

6β,19 - oxido - Δ$^{1,4}$ - pregnadien - 17α-ol-3,20-dione acetate was treated according to Example II, thus furnishing 6β,19 - oxido - 17α - acetoxy-des-A-pregnane-5,20 - dione - 10α - carboxylic acid, 6β,19 - oxido - 17α-acetoxy - des - A - pregnane - 5,20 - dione, 10α - hydroxymethyl - 17α - acetoxy - des - A - 19 - nor-pregnane-5,20-dione and 10α - formyl - 17α - acetoxy-des-A-19-nor-pregnane-5,20-dione.

Example X 17,20;20,21 - bismethylenedioxy - 6β,19-oxido-Δ$^{1,4}$-pregnadiene-3,11-dione was treated according to Example II, thus giving 17,20;20,21 - bismethylenedioxy-6β,19-oxido-des-A-pregnane-5,11-dione-10α-carboxylic acid, 17,20;20, 21 - bismethylenedioxy-6β-19-oxido-des-A-pregnane-5,11-dione, 17,20:20,21 - bismethylenedioxy-10α-hydroxymethyl-des-A-19-nor-pregnane-5,11-dione and 17,20;20,21-bis-methylenedioxy - 10α-formyl-des-A-19-nor-pregnane-5,11-dione.

Example XI 17,20;20,21 - bismethylenedioxy - 6β,19-oxido-Δ$^{1,4}$-pregnadiene-3-one was treated in accordance with Example II, thus furnishing 17,20;20,21-bismethylenedioxy-6β,19-oxido - des-A-pregnan-5-one-10α-carboxylic acid, 17,20; 20,21 - bismethylenedioxy - 6β,19-oxido-des-A-pregnan-5-one, 17,20;20,21 - bismethylenedioxy-10α-hydroxymethyl-des-A-19-nor-pregnan-5-one and 17,20;20,21-bismethylenedioxy-10α-formyl-des-A-19-nor-pregnane-5-one.

Example XII

6β,19 - oxido-Δ$^{1,4}$-pregnadiene-17α-ol-3,20-dione (U.S. Pat. No. 3,008,957) was treated according to Example II, thus furnishing 6β,19-oxido-17α-hydroxy-des-A-pregnane-5,20-dione-10α-carboxylic acid, 6β,19-oxido-17α-hydroxy - des-A-pregnane-5,20-dione, 10α-hydroxymethyl-17α-hydroxy-des-A-19-nor-pregnane-5,20-dione and 10α-formyl-17α-hydroxy-des-A-19-nor-pregnane-5,20-dione.

Example XIII

Δ$^{1,4}$-androstadiene-3,17-dione was treated according to Example II, to give des-A-10α-androstane-5,17-dione.

Example XIV

Δ$^{1,4}$-androstadien-17β-ol-3-one acetate was treated according to Example II, thus yielding 17β-acetoxy-des-A-10α-androstan-5-one.

Example XV

Δ$^{1,4}$-pregnadien-3,20-dione was treated in accordance with Example II to produce des-A-10α-pregnane-5,20-dione.

Example XVI

Δ$^{1,4}$-pregnadiene-17α-ol-3,20-doine was treated by the procedure described in Example II, thus yielding 17α-hydroxy-des-A-10α-pregnane-5,20-dione.

Example XVII 17,20;20,21 - bismethylenedioxy - Δ$^{1,4}$-pregnadiene-3,11-dione was treated according to Example II, to give 17,20; 20,21-bismethylenedioxy-des-A-10α-pregnane-5,11-dione.

Example XVIII

6β,19-oxido-Δ$^{1,4}$-androstadien-17β-ol-3-one was treated according to II, thus furnishing 6β,19-oxido-17β-hydroxy-des-A-androstan-5-one-10α-carboxylic acid, 6β,19-oxido-17β-hydroxy-des-A-androstan-5-one, 17β-hydroxy-10α-hydroxymethyl-des-A-19-nor-androstan-5-one, and 17β-hydroxy-10α-formyl-des-A-19-nor-androstan-5-one.

I claim:
1. A compound of the following formula:

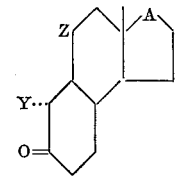

wherein A is a member of the group consisting of

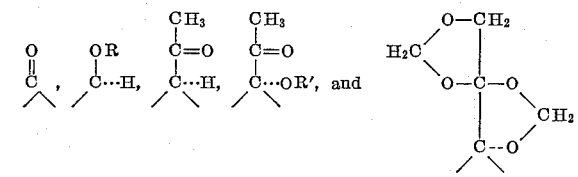

R and R$^1$ are each selected from the group consisting of hydrogen and a lower alkanoyl group; Z is selected from the group consisting of

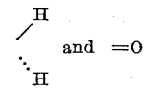

and Y is a member of the group consisting of hydroxymethyl and formyl.

2. A compound of the following formula:

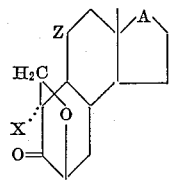

wherein A is a member of the group consisting of

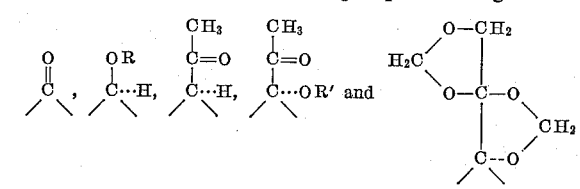

R and R$^1$ are each selected from the group consisting of hydrogen and a lower alkanoyl group, Z is selected from the group consisting of

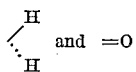

and X is selected from the group consisting of hydrogen and carboxyl.

3. A process which comprises treating a $\Delta^{1,4}$-3-keto-6β,19-oxido steroid selected from the group consisting of the androstane and pregnane series with ozone and subsequently with hydrogen peroxide to give the corresponding 6β,19-oxido des-A-steroid-5-one and the 10α-carboxy derivative thereof.

4. A process which comprises treating a $\Delta^{1,4}$-3-keto-6β,19-oxido steroid selected from the group consisting of the androstane and pregnane series with an alkali metal permanganate and an alkali metal perhalate to give the corresponding 6β,19-oxido-des-A-steroid-5-one, the 10α-carboxy derivative thereof, the corresponding 10α - hydroxymethyl-des-A-19-nor-steroid-5-one and the corresponding 10α-formyl-des-A-19-nor-steroid-5-one.

5. A process which comprises treating a $\Delta^{1,4}$-3-keto steroid selected from the group consisting of the androstane and pregnane series with an alkali metal permanganate and an alkali metal perhalate to give the corresponding des-A-10α-sterod-5-one.

6. The process of claim 4 wherein the alkali metal permanganate is potassium permanganate and the alkali perhalate is sodium periodate.

7. The process of claim 6 wherein the reaction is carried out in t-butanol-water azeotrope.

8. The process of claim 5 wherein the alkali metal permanganate is potassium permanganate and the alkali metal perhalate is sodium periodate.

9. The process of claim 8 wherein the reaction is carried out in t-butanol-water azeotrope.

10. 6β,19 - oxido - 17β-acetoxy-des-A-androstan-5-one-10α-carboxylic acid.

11. 6β,19 - oxido - 17β-hydroxy-des-A-androstan-5-one-10α-carboxylic acid.

12. 6β,19-oxido-17β-acetoxy-des-A-androstan-5-one.

13. 6β,19-oxido-17β-hydroxy-des-A-androstan-5-one.

14. 17β - acetoxy - 10α-hydroxymethyl-des-A-19-nor-androstan-5-one.

15. 17β - hydroxy - 10α-hydroxymethyl-des-A-19-nor-androstan-5-one.

16. 17β - acetoxy-10α-formyl-des-A-19-nor-androstan-5-one.

17. 17β - hydroxy-10α-formyl-des-A-19-nor-androstan-5-one.

18. 6β,19 - oxido - des-A-pregnane-5,20-dione-10α-carboxylic acid.

19. 6β,19-oxido-des-A-pregnane-5,20-dione.

20. 10α - hydroxymethyl - des-A-19-nor-pregnane-5,20-dione.

21. 10α-formyl-des-A-19-nor-pregnane-5,20-dione.

No references cited.

ALEX MAZEL, *Primary Examiner.*

H. R. JILES, *Assistant Examiner.*